No. 686,009. Patented Nov. 5, 1901.
C. E. WADE.
GLASS TUBING.
(Application filed Nov. 22, 1899.)

(No Model.)

WITNESSES:
R. G. Moran
Maude Trumbull

INVENTOR,
Chas. E. Wade
BY D. B. Replogle
ATTORNEY

THE NORRIS PETERS CO., PHOTO-LITHO., WASHINGTON, D. C.

United States Patent Office.

CHARLES E. WADE, OF SCRANTON, PENNSYLVANIA, ASSIGNOR TO THE LACKAWANNA LUBRICATOR AND MANUFACTURING COMPANY, OF SCRANTON, PENNSYLVANIA.

GLASS TUBING.

SPECIFICATION forming part of Letters Patent No. 686,009, dated November 5, 1901.

Application filed November 22, 1899. Serial No. 737,897. (No model.)

*To all whom it may concern:*

Be it known that I, CHARLES E. WADE, a citizen of the United States, residing at Scranton, in the county of Lackawanna and State of Pennsylvania, have invented certain new and useful Improvements in Glass Tubing, of which the following is a specification, reference being had therein to the accompanying drawings.

This invention relates to glass tubing such as is designed to be used in pressure-gages, sight-tubes for steam-boilers, lubricators, and the like.

One object of the invention is to provide a tube capable of withstanding great pressure and capable of holding the fragments of the glass, in case it be broken by pressure, from being thrown promiscuously in all directions, thereby removing the danger from using glass tubes subjected to pressure. Other objects are such as hereinafter appear and are more fully pointed out in the claims.

To this end the invention consists of the construction, combination, and arrangement of the parts herein specified, and illustrated in the accompanying drawings, in which—

Figure 1:
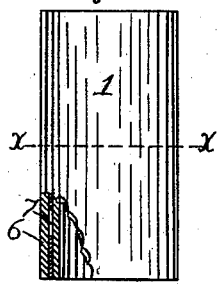
Figure 2:
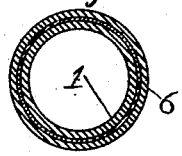
Figure 3:
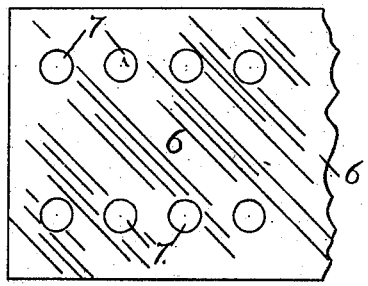

Figure 1 is a side elevation of a piece of glass tubing embodying my invention, a part thereof being broken away to show the structure in cross-section. Fig. 2 is a transverse cross-section of the same on line $xx$ of Fig. 1. Fig. 3 is a diagram of the lamina of mica or other suitable material which is to be embedded in the walls of the glass.

Similar figures of reference denote like and corresponding parts throughout the several views.

Referring to the drawings, 1 designates a glass tube made according to my invention and suitable for use as a sight-tube in lubricators for steam-engines and other purposes. Various lengths may be made, but short lengths are usually what are required for the purpose, such as can readily be cut from pieces of mica, a layer of which (designated 6) is embedded within the walls of the tube. The mica or other suitable tough transparent material is preferably provided with perforations or holes 7 7, &c., as shown in the view in Fig. 3. A plurality of strips of mica overlapping or intermeshing with one another, allowing interstices, might readily be substituted for a perforated piece, as shown.

The mica is inserted into the glass by forming the mica part into tubular form, as required, and setting it into the mold designed to receive the glass, which is forced into the mold in the molten state and forced through and around the mica, thoroughly embedding it into the walls of the tube, after which the tube is removed from the molds and its ends reheated and smoothed.

Since sight-tubes in lubricators and boilers are liable to be exploded by pressure and the flying pieces thereof render it dangerous to attendants, the purpose and utility of my invention and operation thereof are readily understood. The web or lamina embedded in the glass is designed to hold it from disintegration when cracked and it is also intended to make the tube stronger, so as to be less liable to break. Tubes of the kind being inexpensive the cost of the tube is less serious than the danger to the attendant, as many persons are severely scalded and cut about the face and hands and have even lost their eyesight from explosions of such tubes. By providing a means to prevent disintegration of the glass upon cracking I eliminate the danger referred to, as it is well known that valves are placed within the passages leading from the sight-tube space to the boiler in connection with which it is used, so that if the tube is broken by an explosion the flow of steam is automatically shut off after the explosion by the valves just mentioned. Now in case my tube is used after the tube is cracked and the pressure becomes relieved by the steam and water oozing out through the crack the valves aforesaid will close off automatically as long as the pressure is relieved in the sight-tube by any sufficient opening, thus greatly obviating the danger from flying pieces of the bursting tube.

Having thus described my invention, what I claim as new, and desire to secure by Letters Patent, is—

1. A glass tube constructed with a netting or lamina of thin mica embedded within its walls, the glass extending through openings in said net or lamina and binding the outer and inner layers of glass together, substantially as specified.

2. In a sight-tube of the kind described, for lubricators, steam-boilers and the like, the combination of a tubular lamina of thin mica embedded in the walls thereof, the said lamina of thin mica being provided with perforations through which the glass of the tube extends, connecting the outer and inner layers thereof, substantially as specified.

3. A glass tube of the kind described constructed with a foraminated layer of thin transparent tough material embedded within its walls, the glass extending through the foraminations of said material and binding the outer and inner layers of glass together, substantially as specified.

In testimony whereof I affix my signature in presence of two witnesses.

CHARLES E. WADE.

Witnesses:
 LESTER ROCKWELL,
 D. G. MORAN.